(12) United States Patent
Spiegelman et al.

(10) Patent No.: US 11,641,313 B2
(45) Date of Patent: May 2, 2023

(54) ASYNCHRONOUS LIVENESS BOOSTING OF STATE MACHINE REPLICATION

(71) Applicant: VMware, Inc., Palo Alto, CA (US)

(72) Inventors: Alexander Spiegelman, Yoknem (IL); Ittai Abraham, Tel Aviv (IL); Dahlia Malkhi, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 364 days.

(21) Appl. No.: 16/912,536

(22) Filed: Jun. 25, 2020

(65) Prior Publication Data

US 2021/0160152 A1 May 27, 2021

Related U.S. Application Data

(60) Provisional application No. 62/938,695, filed on Nov. 21, 2019.

(51) Int. Cl.
*H04L 41/00* (2022.01)
*H04L 41/0816* (2022.01)
*H04L 67/1001* (2022.01)

(52) U.S. Cl.
CPC .......... *H04L 41/30* (2013.01); *H04L 41/0816* (2013.01); *H04L 67/1001* (2022.05)

(58) Field of Classification Search
CPC . H04L 41/30; H04L 41/0816; H04L 63/1441; H04L 67/1001
See application file for complete search history.

(56) References Cited

U.S. PATENT DOCUMENTS

| | | | |
|---|---|---|---|
| 6,671,821 B1* | 12/2003 | Castro | G06F 11/1482 714/21 |
| 9,230,000 B1* | 1/2016 | Hsieh | G06F 16/27 |
| 2007/0214355 A1* | 9/2007 | Lamport | G06F 11/182 713/156 |
| 2017/0262519 A1 | 9/2017 | Horowitz et al. | |
| 2018/0254892 A1* | 9/2018 | Egorov | H04L 9/0891 |
| 2018/0341930 A1 | 11/2018 | Moir et al. | |
| 2019/0005205 A1 | 1/2019 | Dargar et al. | |
| 2019/0238414 A1* | 8/2019 | Zhu | H04L 67/10 |
| 2020/0034048 A1* | 1/2020 | Gupta | G06F 3/061 |
| 2020/0052954 A1* | 2/2020 | Han | H04L 67/1051 |

OTHER PUBLICATIONS

PCT International Search Report and Written Opinion for PCT/US2020/061389 dated Mar. 16, 2021, 9 pages.
Chrysoula Stathakopoulot et al., "Mir-BFT: High-Throughput BFT for Blockchains", arXiv:1906.05552v1, Jun. 13, 2019 [retrieved on Mar. 8, 2021]. Retrieved from URL: https://arxiv.org/abs/1906.05552v1, 17 pages.

(Continued)

*Primary Examiner* — Mohamed A. Wasel

(57) ABSTRACT

An asynchronous state machine replication solution in a system of replicas includes executing multiple instances of a consensus protocol, referred to as leader-based views (LBVs) in each replica, where each replica is a leader participant in one of the LBV instances. Each replica drives a decision based on the consensus being reached among the LBV instances, rather than relying the expiration of timers and view changes to drive progress.

20 Claims, 9 Drawing Sheets

(56) References Cited

OTHER PUBLICATIONS

Oded Naor et al., "Cogsworth: Byzantine View Synchronization", arXiv:1909.05204v1, Sep. 11, 2019 [retrieved on Mar. 8, 2021]. Retrieved from URL: https://arxiv.org/abs/1909.05204v1, 16 pages.
Jian Yin, et al., "Separating Agreement from Execution for Byzantine Fault Tolerant Services", SOSP'03, Oct. 19-22, 2003, Bolton Landing, New York, USA, 15 pages.
Maofan Yin, et al., HotStuff: BFT Consensus with Linearity and Responsiveness. In Proceedings of the 2019 ACM Symposium on Principles of Distributed Computing. ACM, PODC '19, July 29-Aug. 2, 2019, Toronto, ON, Canada, 10 pages.
Apache Cassandra, Manage Massive Amounts of Data, Fast, Without Losing Sleep, http://cassandra.apache.org/, 2 pages (2016), downloaded Jun. 19, 2020.
Apache Zookeeper, The Apache Software Foundation, https://zookeeper.apache.org/, 2 pages, downloaded Jun. 19, 2020.
Github, "A Scalable Decentralized Lockchain", https://github.com/vmware/concord, 3 pages., downloaded Jun. 19, 2020.
Project Concord, Distrubuted Trust Infrastructure, https://vmware.github.io/concord-bft/, 2 pages., downloaded Jun. 19, 2020.
Etcd: A Distributed, Trust Key-Valve Store for the M,ost Critical Data of a Distributed System, https://etcd.io/, 5 pages., downloaded Jun. 19, 2020.
Hyperledger, Advancing Business Blockchain Adoption Through Global Open Source Collaboration, https://www.hyperledger.org/, 7 pages, downloaded Jun. 19, 2020.
Libra, Cover Letter, white paper, v2.0, from the Libra Assoication Members, https://libra.org/en-US/, 29 pages, downloaded Jun. 19, 2020.
NetEm-Network Emulator, https://www.linux.org/docs/man8/tc-netem.html, 3pages, downloaded Jun. 19, 2020.
Michael Abd-El-Malek, et al., "FaultScalable Byzantine FaultTolerant Services", In Operating Systems Review ,16 pages (2005), downloaded Jun. 19, 2020.
Ittai Abraham et al., "Asymptotically Optimal Validated Asynchronous Byzantine Agreement". In Proceedings of the 2019 ACM Symposium on Principles of Distributed Computing (PODC '19), Jul. 2019, ACM, New York, NY, USA, pp. 337-346.
Yair Amir, et al.,"Customizable Fault Tolerance for wide area Replication". In Reliable Distributed Systems,18 pages, May 2007.
Yair Amir, et al., "Prime: Byzantine Replication Under Attack". IEEE Transactions on Dependable and Secure Computing , 21 pages (2011), downloaded Jun. 19, 2020.
Yair Amir, et al., "Scaling Byzantine Fault Tolerant Replication to Wide Area Networks". In Dependable Systems and Networks, 10 pages (2006), downloaded Jun. 19, 2020.
Michael Ben-Or, "Another Advantage of Free Choice: Completely Asynchronous Agreement Protocols" (extended abstract), 4 pages (1983), downloaded Jun. 19, 2020.
Alysson Bessani, et al., "State Machine Replication for the Masses with BFT-SMaRt", 8 pages, downloaded Jun. 19, 2020.
Dan Boneh, et al., "Short signatures from the Weil pairing", 19 pages, downloaded Jun. 19, 2020.
Christian Cachin, et al., "Secure and Efficient Asynchronous Broadcast Protocols", 18 pages, downloaded Jun. 19, 2020.
Christian Cachin, et al., "Random Oracles in Constantinople: Practical Asynchronous Byzantine Agreement Using Cryptography", 26 pages, Aug. 14, 2000.
Ran Canetti et al., "Fast Asynchronous Byzantine Agreement with Optimal Resilience", 10 pages (1993), downloaded Jun. 19, 2020.
Miguel Castro, et al., "Practical Byzantine Fault Tolerance", Proceedings of the Third Symposium on Operating Systems Design and Implementation, New Orleans, USA, Feb. 1999, 14 pages.
Allen Clement, et al., "Making Byzantine Fault Tolerant Systems Tolerate Byzantine Faults", NSDI 2009: 6th UNSENIX Symposium on Networked Systems Design and Implementation, 16 pages, downloaded Jun. 19, 2020.
James C. Corbett, et al., "Spinner: Google's Globally Dis-tributed Database", ACM Transactions on Computer Systems, vol. 31, No. 3, Article 8, Publication date: Aug. 2013, 22 pages, https://dl.acm.org/citation.
Whitfield Diffie and Martin Hellman, "New Directions in Cryptography", IEEE transactions on Information Theory 22, 6 (1976), 644-654, 11 pages, , downloaded Jun. 19, 2020.
Danny Dolev and H. Raymond Strong, "Authenticated Algorithms for Byzantine Agreement".,SIAM J. Comput. 12, 4 (1983), 656-666, 11 pages, downloaded Jun. 19, 2020.
Sisi Duan, et al., "BChain: Byzantine Replication with High Throughput and Embedded Reconfiguration", 16 pages (2014), downloaded Jun. 19, 2020.
Sisi Duan, et al. "BEAT: Asynchronous BFT Made Practical", Oct. 15-19, 2018, Toronto, ON, Canada, 14 pages.
Cynthia Dwork, et al., "Consensus in the Presence of Partial Synchrony", 36 pages, downloaded Jun. 19, 2020.
Michael J Fischer, et al., "Impossibility of Distributed Consensus with One Faulty Process," Journal of the Association for Computing Machinery, vol. 32, No. 2, Apr. 1985, pp. 374-382.
Juan A Garay and Yoram Moses. "Fully polynomial byzantine agreement for processors in rounds", SICOMP 27-1 (1998), 45 pages, downloaded Jun. 19, 2020.
Rachid Guerraoui, et al., "The Next 700 BFT Protocols," In Proceedings of the 5th European Conference on Computer Systems. ACM, 363-376, downloaded Jun. 19, 2020.
Guy Golan Gueta, et al., "SBFT: A Scalable and Decentralized Trust Infrastructure". In 2019, 49th Annual IEEE/IFIP International Conference on Dependable Systems and Networks (DSN). IEEE, Jun. 2019, pp. 568-580.
Bruce M Kapron, et al., "Fast Asynchronous Byzantine Agreement and Leader Election with Full Information". ACM Transactions on Algorithms, vol. 6, No. 4, Article 68, Publication date: Aug. 2010.
Valerie King and Jared Saia. 2013, "Byzantine Agreement in Polynomial Expected Time", In Proceedings of the Forty-Fifth Annual ACM Symposium on Theory of Computing. ACM, Jun. 2013, pp. 401-410.
Eleftherios Kokoris-Kogias, et al., "Bootstrapping Consensus Without Trusted Setup: Fully Asynchronous Distributed Key Generation", 22 pages, downloaded Jun. 19, 2020.
Ramakrishna Kotla, et al., "Zyzzyva: Speculative Byzantine Fault Tolerance". In ACM SIGOPS Operating Systems Review, vol. 41. ACM, Oct. 2007, 14 pages.
Leslie Lamport ,et al., "Paxos Made Simple". ACM Sigact News 32, Nov. 1, 2001, 14 pages.
Leslie Lamport, et al.,"Ertical Paxos and Primary-Backup Replication", Aug. 2009, 2 pages.
Daniel Lehmann et al., "On the Advantages of Free Choice: A Symmetric and Fully Distributed Solution to the Dining Philosophers Problem", 6 pages (1981).
Kfir Lev-Ari, et al., "A Fair Blockchain Protocol for Financial Institutions", Jun. 10, 2019, 22 pages.
Jinyuan Li and David Maziéres, "Beyond One-Third Faulty Replicas in Byzantine Fault Tolerant Systems", Apr. 2007, 14 pages.
Shengyun Liu, et al., "XFT: Practical Fault Tolerance beyond Crashes". In the Proceeding of12th USENIX Symposium on Operating Systems Design and Implementation (OSDI'16). Nov. 2-4, 2016, Savannah, GA, USA, 17 pages.
Jeane-Philippe Martin and Lorenzo Alvisi, "Fast Byzantine Consensus," IEEE Transactions on Dependable and Secure Computing 3, 3 (2006), downloaded Jun. 19, 2020, 16 pages.
Andrew Miller, et al., "The Honey Badger of BFT Protocols". In Proceedings of the 2016 ACM SIGSAC Conference on Computer and Communications Security, downloaded Jun. 19, 2020, 12 pages.
Achour Mostéfaoui and Michel Raynal, "Signature-free Asynchronous Byzantine Systems: from Multivalued to Binary Consensus with t < n/3, O(n2) Messages, and Constant Time", downloaded Jun. 19, 2020, 21 pages.
Satoshi Nakamoto, et al., Bitcoin: A Peer-to-Peer Electronic Cash System, downloaded Jun. 19, 2020, 9 pages.
Brian M. Oki and Barbara H. Liskov., "Viewstamped Replication: A New Primary Copy Method to Support Highly-Available Distributed Systems". In Proceedings of the Seventh Annual ACM Symposium on Principles of Distributed Computing. ACM, Jan. 1988, 10 pages.

(56) References Cited

OTHER PUBLICATIONS

Diego Ongaro and John Ousterhout, "In Search of an Understandable Consensus Algorithm", in the Proceedings of USENIX ATC '14: 2014 USENIX Annual Technical Conference, Jun. 19-20, 2014, Philadelphia, PA, 16 pages.

Marshall Pease, et al., "Reaching Agreement in the Presence of Faults", Journal of the ACM (JACM) 27, vol. 27, No. 2, Apr. 1980, pp. 228-234.

Michael O. Rabin, "Randomized Byzantine Generals". In 24th Annual Symposium on Foundations of Computer Science (sfcs 1983). IEEE, downloaded Jun. 19, 2020, pp. 403-409.

HariGovind V. Ramasamy and Christian Cachin."Parsimonious Asynchronous Byzantine-Fault-Tolerant Atomic Broadcast", Aug. 19, 2005, 19 pages.

\* cited by examiner

ASYNCHRONOUS LIVENESS BOOSTING OF STATE MACHINE REPLICATION

CROSS REFERENCE TO RELATED APPLICATIONS

Pursuant to 35 U.S.C. § 119(e), this application is entitled to and claims the benefit of the filing date of U.S. Provisional App. No. 62/938,695 filed Nov. 21, 2019, the content of which is incorporated herein by reference in its entirety for all purposes.

BACKGROUND

State Machine Replication (SMR) is a basic component in distributed computing for building fault-tolerant systems. An important aspect of every distributed fault-tolerant system is ensuring that all processes (nodes, servers) within the system arrive at the same conclusion. This is known as requiring "consensus" among parties (participants). A consensus protocol specifies a process among the distributed processes to achieve agreement on a proposed data value. A goal of a consensus protocol is to ensure that every transaction is replicated and recorded in all the machines in the network in the same order. A property of consensus protocols is referred to as "liveness." A consensus protocol is said to be "live" if it is can process new transactions and valid transactions are eventually replicated and recorded. A liveness fault can occur, for example, when a transaction is omitted, information is withheld by a node, and so on.

A distributed system can be characterized as being synchronous, asynchronous, or partially synchronous. In a synchronous system, there is some maximum value ("upper bound") on the time between when a node sends a message and when you can be certain that the receiving node hears the message. In an asynchronous system, messages can take arbitrarily long to reach the nodes and each node can take an arbitrary amount of time to respond. This includes "infinity" meaning that it takes forever for some event to occur. This model is important because it more accurately captures real-world implementations where nodes on the network can fail. In a partially synchronous system, the view is that messages will eventually reach a node.

With the emergence of cross organization Byzantine fault tolerant (BFT) systems, such as Blockchains, which maintain assets with high stake and devise to change the financial world, the assumption of partially synchronous communication may be no longer valid. For example, it is enough for an attacker to dynamically block one party at a time, e.g., through a denial of service, to prevent progress or fairness from leader-based consensus algorithms that are designed for the partially synchronous model (e.g., Practical BFT (PBFT) and Paxos).

In practice, building reliable systems via state machine replication (SMR) requires resilience against all network conditions, including malicious attacks. The best way to model such settings is by assuming asynchronous communication links. However, it is known that deterministic asynchronous SMR solutions are not possible. Two principal approaches are used to circumvent this result. The first approach expects partial synchrony, in which protocols are designed to guarantee safety under worst case network conditions, but are able to satisfy progress only during "long enough" periods of network synchrony. Although this approach is inherently vulnerable to network attacks and delays, it is commonly used in practice. In fact, most deployed systems, several of which have become de facto standards for building reliable systems (e.g., Paxos, PBFT), adopt this approach due to their speed during synchronous attack-free network periods, and their relative simplicity. The second approach employs randomization to guarantee eventual progress with probability 1 under all network conditions. However, although randomized asynchronous solutions are theoretically more robust, they are rarely deployed in practice due to their complexity and overhead, and are mostly the focus of theoretical academic work.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1:
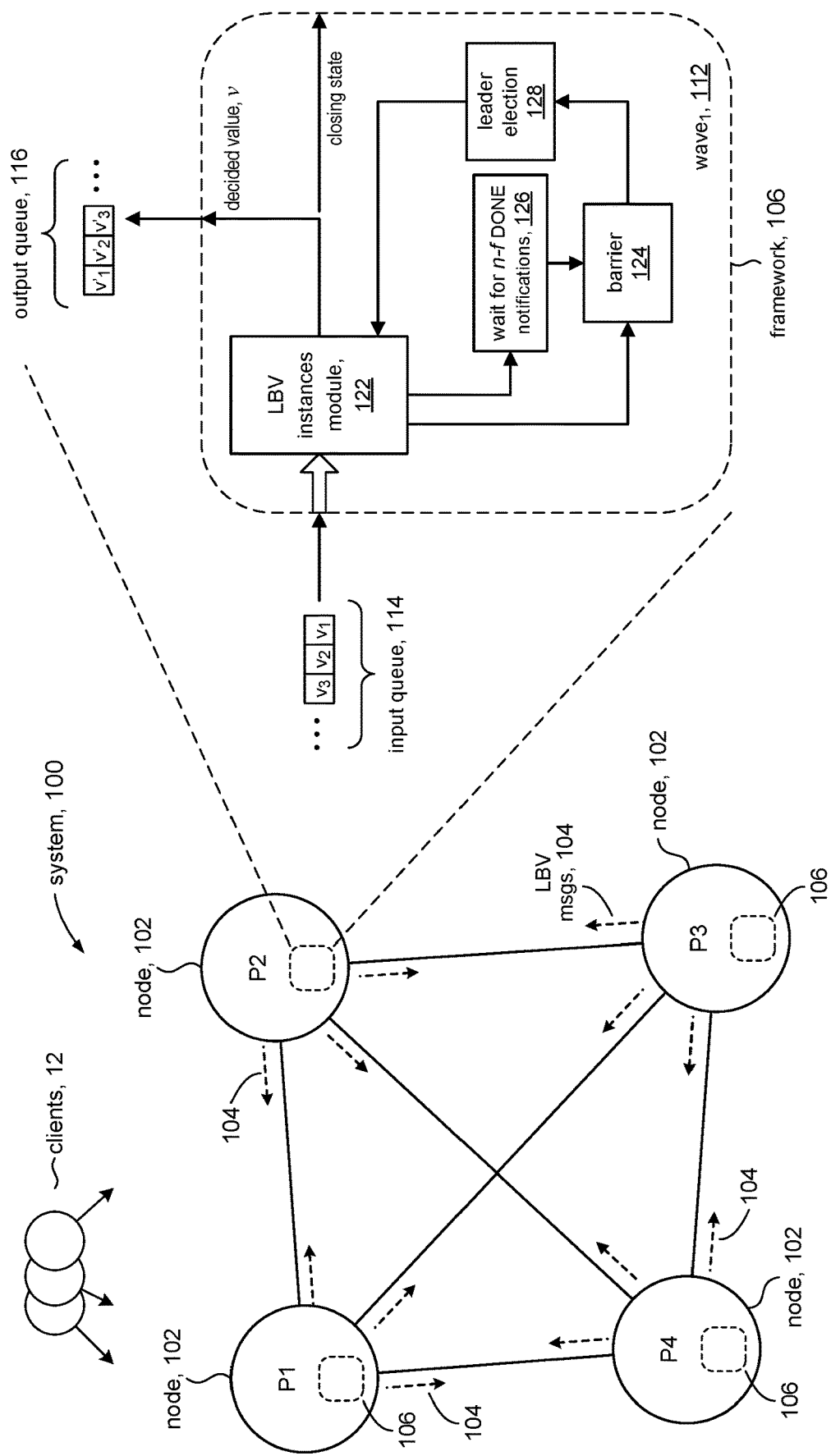
FIG. 1 is a high level representation of a system in accordance with the present disclosure.

In practice, building reliable systems via state machine replication (SMR) requires resilience against all network conditions, including failed nodes, failed communication links, malicious attacks, and so on. A common approach to modelling such settings is by assuming asynchronous communication, which represents a worst-case communication scenario. The present disclosure describes a control mechanism referred to as "the framework" for the design of fault tolerant SMR systems. The framework includes a leader-based-view (LBV) component that encapsulates the core logic of a leader-based view-by-view consensus paradigm (the view implementation) designed for the partially synchronous communication model, and makes a non-trivial use of it in order to boost liveness of existing SMR solutions. The framework hides any model assumptions that a specific SMR implementation might have, including the ratio of faulty to correct parties and types of faulty parties, as long as it provides the properties required by the LBV abstraction. For example, when instantiated with a partially synchronous consensus algorithm (protocol) designed to tolerate crash failures, e.g., Paxos and Raft, the framework of the present disclosure yields an asynchronous SMR for n=2f+1 parties, where n refers to the number of participants (parties, replicas, nodes, etc.) that participate in the protocol and f is the number of participants that can fail or otherwise be compromised. If the underlying consensus protocol is a byzantine solution like PBFT or HotStuff, the framework yields an asynchronous byzantine SMR for n=3f+1 parties.

Processing in accordance with the present disclosure can provide liveness boosting by controlling the view-change trigger via a wave mechanism. Rather than using timers, the wave mechanism uses an application programming interface (API) provided by the LBV component to generically rearrange view-by-view protocols in a way that allows progress at network speed. The wave mechanism is based on a property that all view-by-view protocols share, namely if the leader of a view is correct and timers never expire, then eventually a decision will be made in this view. Given this property, a wave operate as follows: Instead of running one LBV instance (as view-by-view protocols do), a wave runs n LBV instances (the leader-based phase) simultaneously, each with a distinct designated leader. Then, the wave performs a barrier synchronization in which parties wait until a quorum of the instances have reached a decision. As noted above, all instances with correct leaders eventually decide so eventually the barrier synchronization is reached.

As used herein "correct" is a technical term in the art of consensus algorithms. A correct party, for example, is a party that does not experience failure, is not compromised, does not behave maliciously, and so on.

After the barrier is reached, one LBV instance is selected unpredictably and uniformly at random. The chosen instance "wins," and all other instances are ignored. Then, parties (participants) invoke the view-change phase in the chosen instance (only). The view-change phase here has two purposes. First, it boosts termination. If the chosen instance has reached a decision, meaning that a significantly large quorum of parties decided, then all correct parties learn this decision during the view-change phase. Otherwise, if the chosen instance has not reached a decision, as in every view-by-view protocol, the view-change phase ensures safety by making sure the leaders of the next wave can only propose safe values. The next wave enacts n new LBV instances, each one with a different leader that proposes a value according to the information returned from the view-change phase of the chosen instance of the previous wave. Note that since parties wait for a quorum of LBVs to reach a decision in each wave before randomly choosing one, the chosen LBV instance has a constant probability of having a decision, hence, together with the termination boosting provided by the viewchange phase, we get progress, in expectation, in a constant number of waves.

The framework of the present disclosure can take any view-by-view protocol designed for the partially synchronous model and transform it into an asynchronous solution. Meaning that the framework can turn any protocol that is safe under asynchrony into a protocol that also guarantees eventual progress. An aspect of the framework is fairness. The election mechanism of the framework provides an equal chance for all correct parties to drive decisions during synchrony, and optimally bounds the probability to decide a value proposed by a correct party during asynchrony. Another aspect of the framework is its model indifference, namely the framework does not add any model assumptions to the assumptions made by the underlying consensus protocol. For example, when the underlying consensus protocol is a BFT protocol such as PBFT we get an asynchronous byzantine state machine replication. Likewise, when the underlying consensus protocol is a crash-failure solution like Paxos or Raft we get the first asynchronous SMR system tolerating any minority of failures.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

FIG. 1 shows a system 100 for distributed state machine replication (SMR) in accordance with the present disclosure. Some aspects of a conventional SMR are described to provide context for the present disclosure. Nodes (e.g., servers) 102 simulate a state machine in a fault tolerant manner. Clients 12 send commands as if there is a single state machine. Maintaining a single state machine in a single, however, is prone to crashes or Byzantine faults. Thus, instead of maintaining a single node, system 100 uses multiple nodes 102, sometimes referred to as replicas, with the expectation that some of them can be faulty. The group of nodes presents the same interface as that of a single node to the client.

Nodes (also referred to as replicas) 102 all initially start with the same state. However, when they receive concurrent requests from a client 12, honest replicas first need to agree on the sequence of client commands received by them. This problem is called log replication, and it is a multi-shot version of consensus; "single-shot" refers to reaching consensus on a single command, whereas "multi-shot" refers to reaching consensus on a sequence of commands on command at a time. After the sequence is agreed upon, the nodes can apply the commands in the shared log, one by one to recreate the system state. All honest replicas maintain an identical state at all times.

A goal of system 100 is to guarantee the following:
Safety—This means that any two honest replicas will store the same sequence of commands in their logs.
Liveness—This means that honest server replicas will eventually execute a command proposed by a client.

Just to illustrate with a specific example, a commonly known application of SMR is the blockchain, which is the underlying mechanism for Bitcoin. A blockchain is a monotonically increasing list of records (or blocks) that are linked together using cryptographic techniques. Blocks consist of valid transactions that are hashed and encoded. Each block contains a cryptographic hash of the previous block in the chain. Core to the blockchain is the notion of a ledger, an unalterable, append-only log of the transactions that take place across various entities. To maintain the integrity of the ledger, the various entities need a way to "agree" (i.e., to reach consensus) on which set of blocks (transaction) are to be appended to the ledger. One or more faulty nodes can skew the outcome, resulting in consensus that is unachievable or incorrect.

Going forward in the present disclosure, the term "party" will be used interchangeably with nodes (replicas) 102. Items to be agreed on (e.g., commands, blocks, etc.) will be referred to more generally as "values." A node receives values (commands, block, etc.) from clients 12, which are stored in the node's input queue 114 to be processed. Agreed upon values are stored in the node's output queue 116 (e.g., shared log, the ledger, etc.).

The example shown in FIG. 1 comprises a network of four participating nodes (referred to herein as parties) 102, although it will be appreciated that in other embodiments system 100 can comprise a larger number of parties. In accordance with the present disclosure, each party 102 can execute a consensus protocol in accordance with framework mechanism 106 (referred to herein as framework 106, or simply the framework). Each party 102 can exchange leader-based view (LBV) messages 104 with each other. LBV messages 104 can include messages that relate to the execution of the underlying consensus protocol itself, and messages that relate to operation of the framework mechanism.

The framework mechanism provides asynchronous boosting that is model agnostic and applicable to a consensus leader-based view-by-view protocols designed for the partially synchronous communication model, such as PBFT, Paxos, and HotStuff for example. Consensus protocols that follow the leader-based view-by-view paradigm divide executions into a sequence of views, each with a designated leader. Each view is then further divided into two phases. First, the leader-based phase in which the designated leader tries to drive progress by getting all parties to commit its value. Then, when parties suspect that the leader is faulty, whether it is really faulty or due to asynchrony or network attacks, they start the view-change phase in which they exchange information to safely wedge the current view and move to the next one.

The leader-based view (LBV) is an abstraction that encapsulates the core logic of every view and provides an API that allows de-coupling of the leader-based phase from the view-change phase. In the partial synchrony approach, view-change phases are triggered with timers: parties start a timer at the beginning of each view and if the timer expires before the leader drives progress, parties move to the view-change phase. However, this may not be live during periods of network asynchrony as views may expire indefinitely without progress.

The framework of the present disclosure does not rely on timeouts. By de-coupling the leader-based phase from the view-change phase, we avoid having to use timers. As explained below, parties operating under the framework run several instances of the underlying consensus protocol where each party is a leader in one of those instance. The view-change phase occurs when a quorum of parties as leaders reach consensus in their leader-based phase rather than relying on a timer.

As shown in FIG. 1, reaching consensus on the decision of a value using framework 106 progresses in one or more "waves" 112. Aspects of framework 106 in accordance with the present disclosure are discussed in more detail below. Briefly, however, each wave 112 processes a proposed input value in accordance with an underlying consensus protocol. In the case of the first wave, wave$_1$ in FIG. 1 for example, the proposed value can come from a queue 114 of input values. In the case of a wave (wave$_2$, not shown) subsequent to the first wave, the proposed value (input) to wave$_2$ is the proposed value is contained in the closing state of the previous wave (waves). LBV instances module 122 represents the concurrent execution of the underlying consensus protocols by each party 102, both as a leader and a non-leader. LBV instances module 122 includes an LBV instance (FIG. 2) that represents execution of the underlying consensus protocol by a party 102, where that party is a leader participant in the LBV instance and the other parties are non-leader participants in the LBV instance. Each party 102 in the system is associated with an LBV instance.

Each party in wave 112 synchronizes at barrier 124, waiting for a number (n f) DONE notifications 126 from the LBV instances. Leader election 128 represents the election of a leader from among the LBV instances (chosen LBV). If the chosen LBV instance has reached a decision, then each party can store the agreed-upon value in their respective queue 116 of output values. If the chosen LBV instance has not reached a decision, then processing can continue with another wave 112 using the closing state of the chosen LBV instance as input to the next wave. The closing state includes all the necessary information required by the underlying consensus protocol (e.g., a safe value for a leader to propose and a validation function for all parties use to check if the proposed value is safe). A sequence of one or more waves 112 to reach consensus on a single value represents a single-shot agreement.

Figure 2:
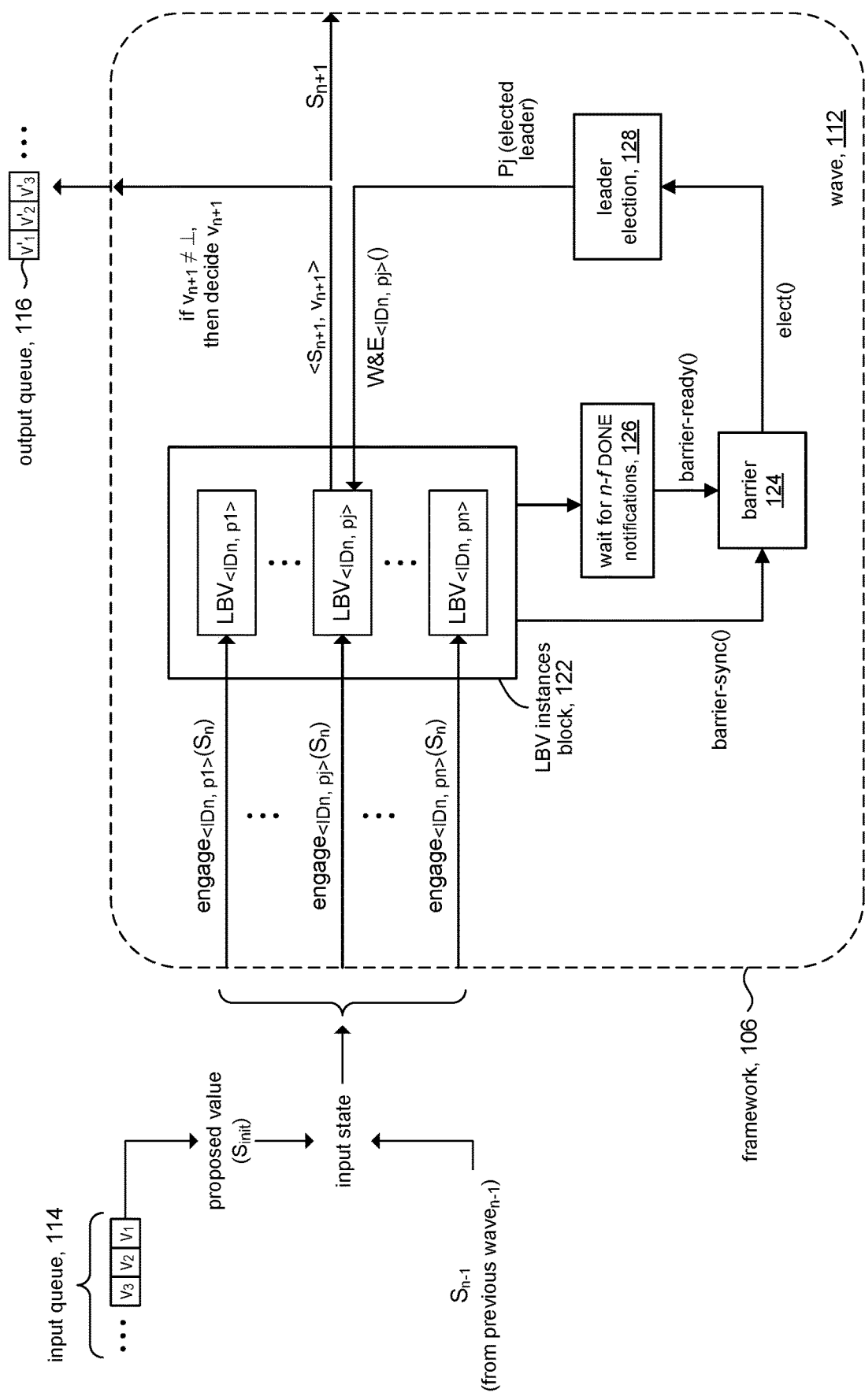
FIG. 2 illustrates details of a framework for driving decisions in accordance with the present disclosure.

FIG. 2 shows additional details of framework 106. The framework describes processing to drive parties 102 to reach consensus on a proposed value in accordance with the present disclosure. Each party 102 includes input queue 114 comprising values that it wants to propose. When a party (e.g., P$_1$) wants to propose a value from its input queue 114, the party will invoke the framework with the proposed value, which can be encapsulated in an initial input state (S$_{init}$) to the framework. As will be explained below, the framework will drive processing by the parties to reach consensus (i.e., agree on) the proposed value in accordance with the underlying consensus protocol. As explained above, the framework proceeds in waves, so the proposed value provided to the first wave comes from the input queue, and the proposed value that is input to a subsequent wave is contained in the closing state (S$_{n-1}$) of a previous wave. In some embodiments, the input queues can be first-in, first-out (FIFO) queues. Accordingly, parties do not advance to the next slot in the queue until they learn the decision of the proposed value in the current slot.

In some embodiments, framework 106 can initiate a wave 112 by engaging parties 102 in the system to run the underlying consensus protocol. More specifically, an instance of the underlying consensus protocol is initiated for each party, where that party is designated as the leader. Each instance of the underlying consensus protocol is referred to herein as an LBV instance, and is shown in FIG. 2 as an instance among a collection of LBV instances in LBV instances block 122. For example, LBV<IDn, p1>, represents execution of the underlying consensus protocol where party P$_1$ is the leader. Likewise, LBV<IDn, pj>, represents execution of the underlying consensus protocol where party P$_j$ is the leader, and so on. Accordingly, for n parties each wave will instantiate n corresponding LBV instances, where LBV<IDn, px> has party P$_x$ as leader. For simplicity, we can denote LBV<IDn, px> as LBV$_x$.

LBV instances that execute the underlying consensus protocol in accordance with the present disclosure, as a whole, exhibits the following properties:

Liveness:
  Engage-Termination: For every instance with a correct leader, if all correct parties invoke engage and no correct party invokes wedge&exchange, then engage invocations by all correct parties eventually return.
  Wedge&Exchange-Termination: For every instance, if all correct parties invoke wedge&exchange then all wedge&exchange by correct parties eventually return.
Safety:
  Validity: For every instance, if an engage or wedge&exchange invocation by a correct party returns a value v, then v is externally valid.

Completeness: For every instance, if f+1 engage invocations by correct parties return, then no wedge&exchange invocation by a correct party returns a value v=⊥ (referred to as a safe value).

Agreement: If an engage or wedge&exchange invoked in some instance by a correct party returns a value v≠⊥ and some other engage or wedge&exchange invoked in some instance by a correct party returns v'≠⊥ then v=v'.

In accordance with the present disclosure, framework 106 includes a wedge and exchange mechanism that comprises barrier 124. The barrier represents a synchronization point during a wave where parties 102 wait for an event before proceeding. In accordance with the present disclosure, parties 102 wait for the occurrence of n−f DONE notifications 126, before proceeding to the leader election 128. As explained below, a DONE notification indicates that a decision has been reached by a quorum of LVB instances; i.e., n−f FIG. 2 shows that party $P_j$ has been elected leader and that a wedge and exchange (W&E) is invoked on the LBV instance in which party $P_j$ is the leader ($LBV_j$) to "wedge" the LVB instance and determine what happened in its leader-base phase. The closing state ($S_{n+1}$) and decided value ($v_{n+1}$) are obtained from the state information for party $P_j$ for the next wave.

Framework 106 in accordance with the present disclosure captures the core properties provided by a single view in leader-based view-by-view algorithms (e.g., Paxos, PBFT, HotStuff, etc.), but avoids their timeout mechanism. Each view in such an algorithm consists of two phases: first, all parties wait for the leader to perform the leader-based phase to drive a decision on some value v, and then, if the leader fails to do it fast enough, the parties switch to the view-change phase in which they wedge the current leader and exchange information in order to get the closing state of the view. To decide when to switch between the phases, existing algorithms use timeouts, which prevent them from guaranteeing progress during asynchronous periods. The wedge and exchange mechanism described above can boost liveness because the mechanism does not rely on a timeout to switch from the leader-based phase to the view-change phase. Instead, the wedge and exchange mechanism proceeds as soon as n−f DONE notifications are detected.

To this end, framework 106 exposes two methods (mechanisms), engage and wedge&exchange, where the engage method starts the first phase of the view (leader-based) and the wedge&exchange method switches to the second phase of the view (view-change). By exposing these two methods, the framework takes over the responsibility on when to switch between the phases from the view so that the process no longer relies on timeouts inside a view, while still preserving all safety guarantees provided by a view in a leader-based view-by-view protocol. By taking over responsibility on when to switch between the phases, the framework can more quickly respond to asynchronous situations, for example when a party becomes unresponsive due to failure or an attack.

Framework 106 operates in accordance with the following pseudocode:

---
ALGORITHM 1
---
1: upon SS-propose(id, S) do
2:    state ← S ; wave ← 1
3:    while true do
4:       ID ←⟨ id, wave⟩
5:       ⟨state', value⟩← WAVE(ID, state)

---
ALGORITHM 1 -continued
---
6:       if value , ⊥ and did not decide before then
7:          decide⟨ id, value⟩
8:       state ← state'
9:       wave ← wave + 1
10: procedure WAVE(ID, state)
11:    for all $p_j = p_1, \ldots, p_n$ do
12:       invoke engage⟨$_{ID, pj}$⟩(state)▷ non-blocking
13:    barrier-sync$_{ID}$( )
14:    leader ← elect$_{ID}$( )
15:    return wedge&exchange⟨$_{ID, leader}$⟩( )
16: upon engage⟨ ID, $p_j$⟩ returns v do
17:    send "ID, ENGAGE-DONE" to party $p_j$
18: upon receiving n-f "ID, ENGAGE-DONE" messages do
19:    invoke barrier-ready$_{ID}$( )

where an invocation of the protocol (SS-propose(id, S)) gets an initial state S and identification id, where the initial state S contains all the initial specific information (including the proposed value) required by the leader-based view-by-view protocol instantiated in the LBV abstraction.

As noted above, the protocol proceeds in waves. The state is updated at the and of every wave and a decision is made the first time a wave returns a non-empty value. At the beginning of every wave, each party invokes the engage operation in n LBV instances associated with the wave, each with a different leader. Each invocation gets the state obtained in the end of the previous wave or the initial one in case of the first wave.

Parties invoke barrier-sync and wait for it to return. As explained below in accordance with the B-Coordination property, barrier-sync returns only after f+1 correct parties invoke barrier-ready. When an engage invocation in an LBV instance with leader $p_j$ returns, a correct party sends an "ENGAGE-DONE" message to party $p_j$, and whenever a party gets n−f such messages it invokes barrier-ready( ). Denote an LBV instance as successfully completed when f+1 correct parties completed the first phase, i.e., their engage returned, and note, therefore, that a correct party invokes barrier-ready only after the LBV instance in which it acts as the leader was successfully completed. Thus, a barrier-sync invocation by a correct party returns only after f+1 LBV instances successfully completed.

Next, when the barrier-sync( ) returns, parties elect a unique leader via leader election, and further consider only its LBV instance. Note that since parties wait until f+1 LBV instances have successfully completed before electing the leader, the parties elect a successfully completed instance with a constant probability of $$\frac{f+1}{n},$$

and even an adaptive adversary has no power to prevent it.

Finally, all parties invoke wedge&exchange (W&E) in the elected LBV instance to wedge and find out what happened in its first phase, using the returned state for the next wave and possibly receiving a decision value. By the above completeness property of LBV, if a successfully completed LBV instance is elected, then all wedge&exchange invocations by correct parties return v≠⊥ and thus all correct parties decide v in this wave. Therefore, after a small number of $$\frac{n}{f+1}$$

waves all correct parties decide in expectation. Note that the sequence of chosen LBV instances form a properly composed execution, and thus since parties return only values returned from chosen LBVs, our algorithm inherits its safety guarantees from the leader-based protocol the LBV is instantiated with.

The discussion will now turn to a description of an illustrative embodiment in accordance with Algorithm 1. Framework 106 represents a mechanism and properties of the mechanism to drive parties 102 to reach consensus on a queue of input values, one value (slot) at a time, in accordance with the present disclosure. As noted above, the framework runs an underlying consensus protocol (algorithm). In accordance with the present disclosure, each part 102 runs multiple instances of the underlying protocol. Framework 106 includes mechanics to control and coordinate the parties. The discussion will now turn to a description of processing in each party 102 and the control and coordinate mechanics of the framework.

Figure 3:
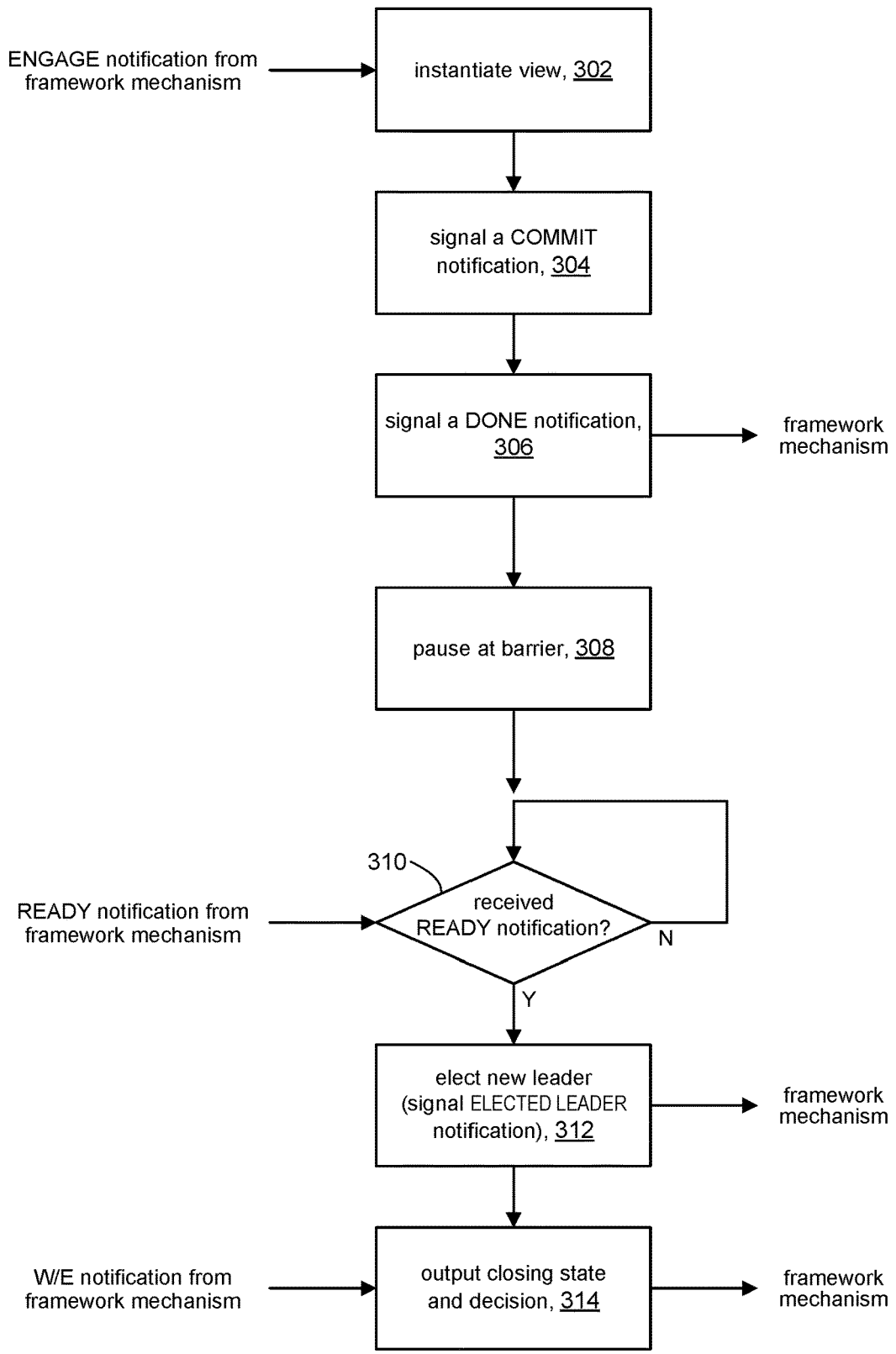
FIG. 3 shows operations performed by parties in a system to reach consensus in accordance with the present disclosure.

Referring to FIG. 3 and other figures, the discussion will now turn to a high level description of operations and processing by each party (e.g., node 102, FIG. 1) in a system (e.g., 100) to reach consensus in accordance with the present disclosure. As shown and explained in FIG. 1, the framework (e.g., 106) progresses in waves 112. The processing described in FIG. 3 below represents processing in each party for a wave. In some embodiments, the party can include computer executable program code, which when executed by the processor(s) in the party's computer system (e.g., 902, FIG. 9), can cause the party to perform processing in accordance with FIG. 3. The operation and processing blocks described below are not necessarily executed in the order shown, and can be allocated for execution among one ore more concurrently executing processes and/or threads.

At operation 302, each party can instantiate an instance of a leader-based view (LBV) in accordance with the underlying consensus protocol in response to receiving an ENGAGE notification (ENGAGE-DONE in algorithm 1) from the framework. This notification is discussed in more detail below. In some embodiments, for example, the engage method can be a signaling mechanism; e.g., a remote procedure call (RPC). The ENGAGE notification can include state information that includes all the necessary information required by the underlying consensus protocol (e.g., a safe value for a leader to propose and a validation function for all parties use to check if the proposed value is safe) to initiate the LBV instance. In the case of the initial wave (e.g., 112, FIG. 1), the ENGAGE notification can indicate this is the initial wave so that the party knows to obtain the proposed value from its input queue (e.g., 114).

Figure 4A:
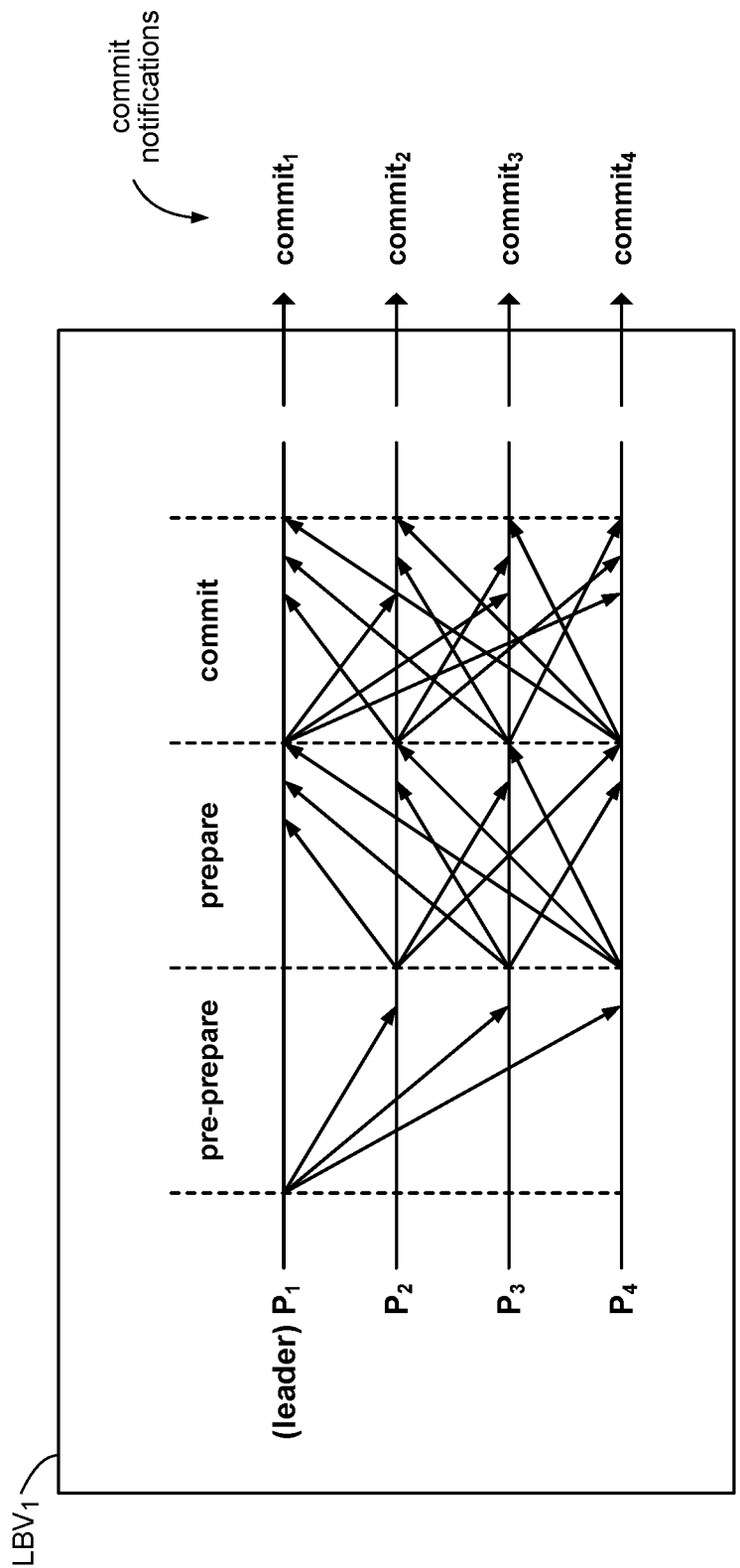
FIGS. 4A and 4B show illustrative underlying consensus protocols (algorithms) that can be adapted in accordance with the present disclosure.
Figure 4B:
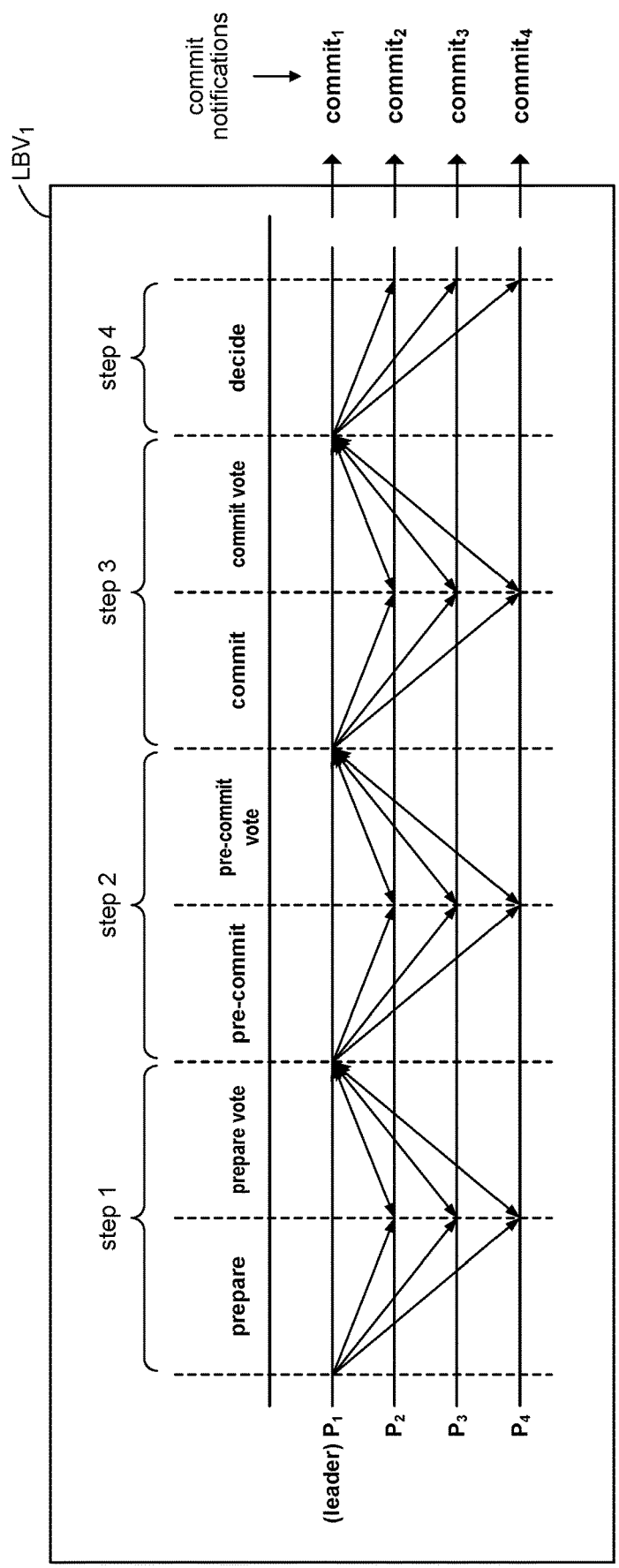

Referring for a moment to FIGS. 4A and 4B, details of an instance of leader-based view (LBV) will be described in the context of illustrative examples of well known consensus protocols. FIG. 4A shows execution in the leader phase of the Practical Byzantine Fault Tolerance (PBFT) consensus protocol and FIG. 4B shows leader-phase execution of the HotStuff protocol. The examples show party $P_1$ is the leader participant and parties $P_2$, $P_3$, $P_4$ are non-leader participants in the LBV instances shown in FIG. 4A and in FIG. 4B. It will be appreciated that the underlying consensus protocol can be any asynchronous consensus protocol.

In accordance with the present disclosure, the framework mechanism signals each party in the system to run the underlying protocol as a leader using the ENGAGE notification. FIG. 2, for example, shows that the engage method is invoked for each party. Accordingly, party $P_1$ runs the underlying protocol as the leader in $LBV_1$, while the other parties ($P_2$–$P_n$) in $LBV_1$ participate as non-leaders. Party $P_2$ runs the underlying protocol as the leader in $LBV_2$, while the other parties ($P_1$ and $P_3$–$P_n$) in $LBV_2$ participate as non-leaders. In general, party $P_j$ runs the underlying protocol as the leader in $LBV_j$, while the other parties ($P_1$–$P_{j-1}$ and $P_{j+1}$–$P_n$) in $LBV_j$ participate as non-leaders, and so on. It can be seen that each party in the system participates in an LBV instance, either as the leader or as a non-leader. As such, in accordance with the present disclosure, each party in a system of n parties (nodes, replicas, etc.) participates in n instances of the underlying protocol, either as a leader or a non-leader.

At operation 304, each party can signal a COMMIT notification. In some embodiments, for example, when a party in an LBV instance (whether as leader or non-leader) reaches a decision, the party can signal a COMMIT notification to indicate the party has reached consensus on the proposed value. The criterion for signaling a COMMIT notification will depend on the particular underlying consensus protocol. Referring to FIG. 4A, for example, in the PBFT protocol, when a party (e.g., $P_1$) receives a quorum (n–f) of COMMIT messages from the other parties, this can be deemed as the party having reached consensus with the other parties in this LBV instance, where n is the number of parties (in this case, n=4) and f is the number of parties that can fail (in this case, f=1). Accordingly, the party can signal a COMMIT notification. Supposing that all parties in FIG. 4A are correct, each party will signal a corresponding COMMIT signal to indicate to the framework that the party has reached consensus in the given LBV instance. Likewise, in the HotStuff protocol of FIG. 4B the leader will signal a COMMIT notification when it receives (n–f) COMMIT votes (consensus reached) from the non-leader participants. On the other hand, each non-leader participant signals a COMMIT notification when the participant receives a DECIDE message from the leader.

Figure 5:
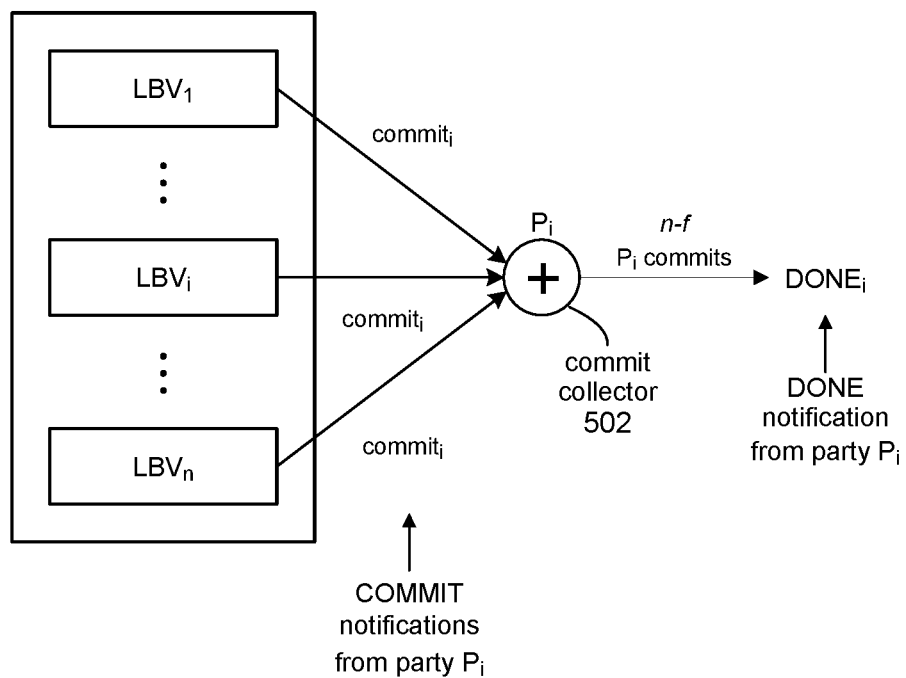
FIG. 5 illustrates processing by a party to generate a DONE notification.

At operation 306, each party can signal a DONE notification to the framework. In accordance with the present disclosure, a party can signal a DONE notification when the party has signaled (n–f) COMMIT notifications. Referring to FIG. 5 for a moment, the figure illustrates this aspect of the present disclosure. As explained above a party $P_i$, in accordance with the present disclosure, executes n LBV instances of the underlying consensus protocol; running one instance as a leader and running n–1 instances as a non-leader. Party $P_i$ can signal a COMMIT notification from each instance of the protocol, depending on the decision outcome in that instance. In some embodiments, $P_i$ can include a commit collector 502 which tracks the number of COMMIT notifications that were signaled by $P_i$, whether as a leader or as a non-leader. For example, the commit collector 502 can be a process or thread that executes on $P_i$ and counts the number of COMMIT notifications that it signals. Continuing with FIG. 3, when the party has signaled (n–f) COMMIT notifications, the party can signal a DONE notification 504 to the framework.

At operation 308, each party can pause after it has signaled the DONE notification. In accordance with the present disclosure, further progress by a party in terms of processing a wave can be paused at this time. This "pause" can be represented as barrier 124 in FIG. 2. In accordance with the present disclosure, every party that signals a DONE notification can pause at this barrier. This barrier is used to synchronize between parties, ensuring that correct parties wait for each other before progressing. The barrier is characterized by the following properties:

B-Coordination: No barrier-sync invocation by a correct party returns before f+1 correct parties invoke barrier-ready.

B-Termination: If all correct parties invoke barrier-ready then all barrier-sync invocations by correct parties eventually return.

B-Agreement: If some barrier-sync invocation by a correct party returns, then all barrier-sync invocations by correct parties eventually return.

Each party will hit barrier 124 and pause after sending its DONE notification.

At operation 310, each party can wait for a READY notification from the framework before proceeding past the barrier.

At operation 312, each party can elect a leader in response to receiving a READY notification from the framework. This notification is discussed in more detail below. Referring to FIG. 2, in accordance with the present disclosure, the party can proceed to leader election when it receives a READY notification from the framework. Leader election in accordance with the present disclosure, includes the party selecting a leader from among the parties in the system. As will be seen, the elected leader is a "leader" in the sense that it's closing state may become the input state to a subsequent wave. Each party receiving the READY notification will proceed and perform leader election.

Leader election algorithms are known. A leader election algorithm will decide on exactly one leader among the parties in the system when executed by the parties in the system. A valid leader election algorithm in accordance with the present disclosure has the following properties:

L-Termination: If f+1 correct parties perform leader election, then all invocations by correct parties return (complete the algorithm).

L-Agreement: All invocations of the leader election algorithm by correct parties that return, return the same party.

L-Validity: If an invocation of the leader election algorithm by a correct party returns, it returns a party pi with probability 1/n for every pi∈{p1, . . . , pn}.

L-Unpredictability: The probability of the adversary (faulty party) to predict the returned value of an elect invocation by a correct party before any correct party invokes elect is at most 1/n.

The party can signal the framework with an ELECTED LEADER notification, including information about the elected leader.

At operation 314, each party can respond to a W/E (wedge & exchange) notification from the framework. As will be explained, the W/E notification identifies the LBV instance in which the elected leader was executing as the leader participant. Thus, for example, if party $P_j$ is the elected leader per leader election in operation 312, the W/E notification will identify the LBV instance. Each party, in response to receiving the W/E notification, will find out what happened in the identified LBV instance. The party that is the leader in the identified LBV instance will provide its state information and a decision value to the framework. Processing in this wave can be deemed complete so each party can terminate its LBV instances in preparation for another possible wave.

Figure 6:
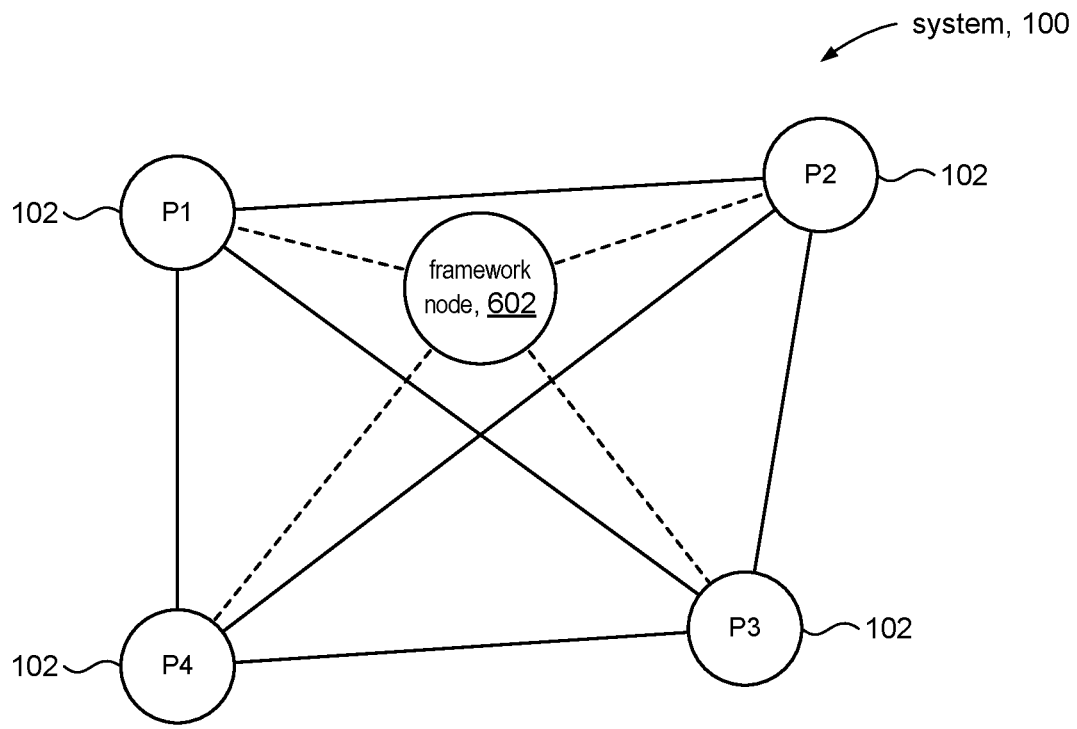
FIG. 6 shows an illustrative example of the framework mechanism.

The discussion will now turn to a description of the framework mechanism 106 shown in FIG. 1. The framework mechanism can be embodied in system 100 in any suitable manner. FIG. 1, for example, shows that in some embodiments the framework mechanism can be embodied as background processes executing in the parties themselves. Framework signaling can be passed between parties as LBV messages 104. Referring to FIG. 6, in some embodiments, the framework mechanism can be another node (framework node) 602 in the system. The framework node 602 can receive signaling from parties P1-P4 (e.g., using RPCs) and send notifications to the parties, in accordance with processing in FIG. 3 for example.

Figure 7:
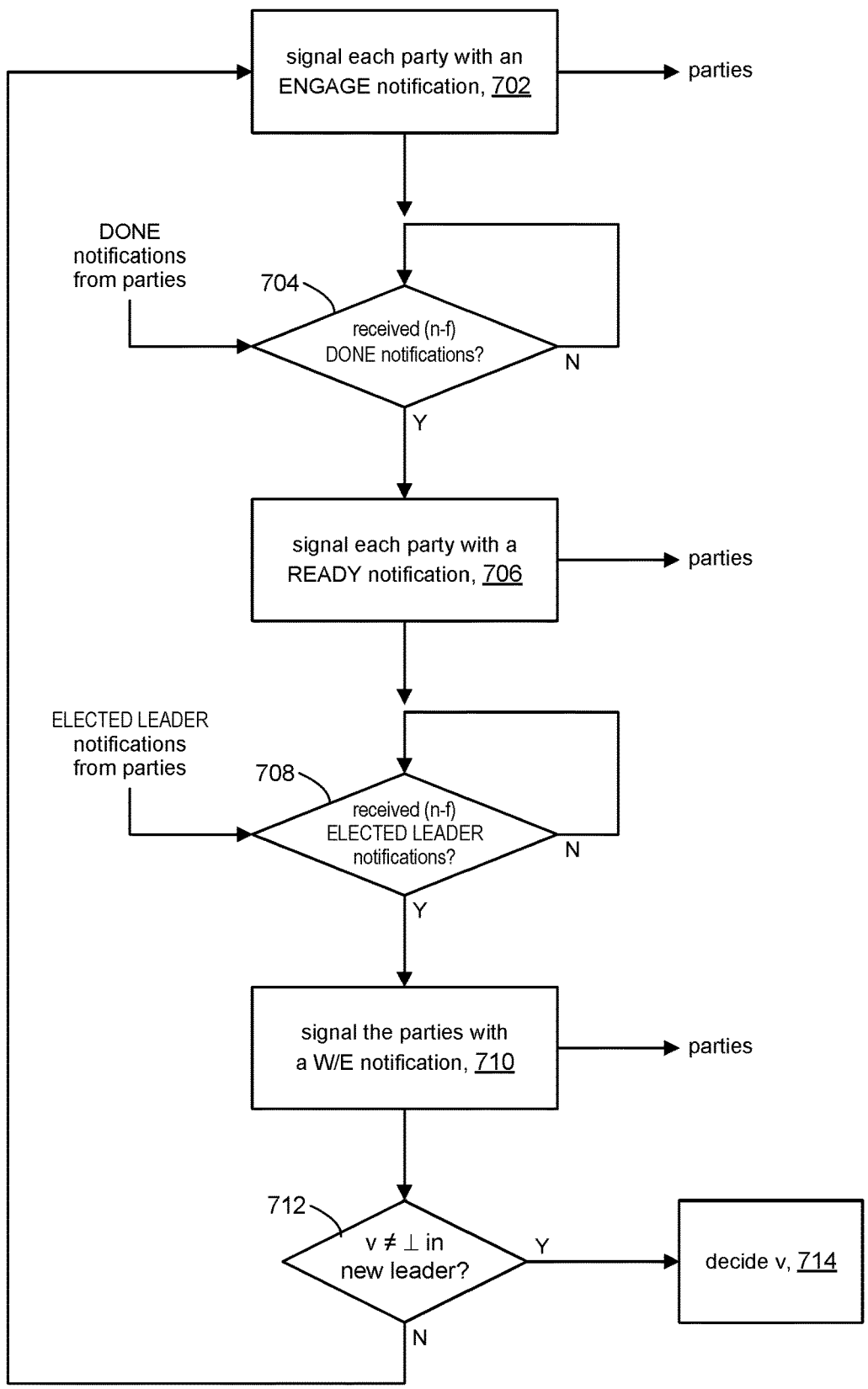
FIG. 7 shows operations of the framework mechanism in accordance with the present disclosure.

Referring to FIG. 7 and other figures, the discussion will now turn to a high level description of operations and processing by the framework mechanism (106, FIG. 1) in accordance with the present disclosure. In some embodiments, the framework mechanism can include computer executable program code that executes in the parties 102 or in a separate framework node (FIG. 6). The computer executable program code, when executed by a processor (e.g., 902, FIG. 9), can cause the processor to perform operations in accordance with FIG. 7. The operation and processing blocks described below are not necessarily executed in the order shown, and can be allocated for execution among one ore more concurrently executing processes and/or threads.

At operation 702, the framework mechanism can signal each party with an ENGAGE notification. In some embodiments, for example, the ENGAGE notification can be a message that is sent to each party. Recall from FIG. 3 that each party, in response to receiving an ENGAGE notification, initiates an instance of the underlying consensus protocol as the leader.

Figure 8:
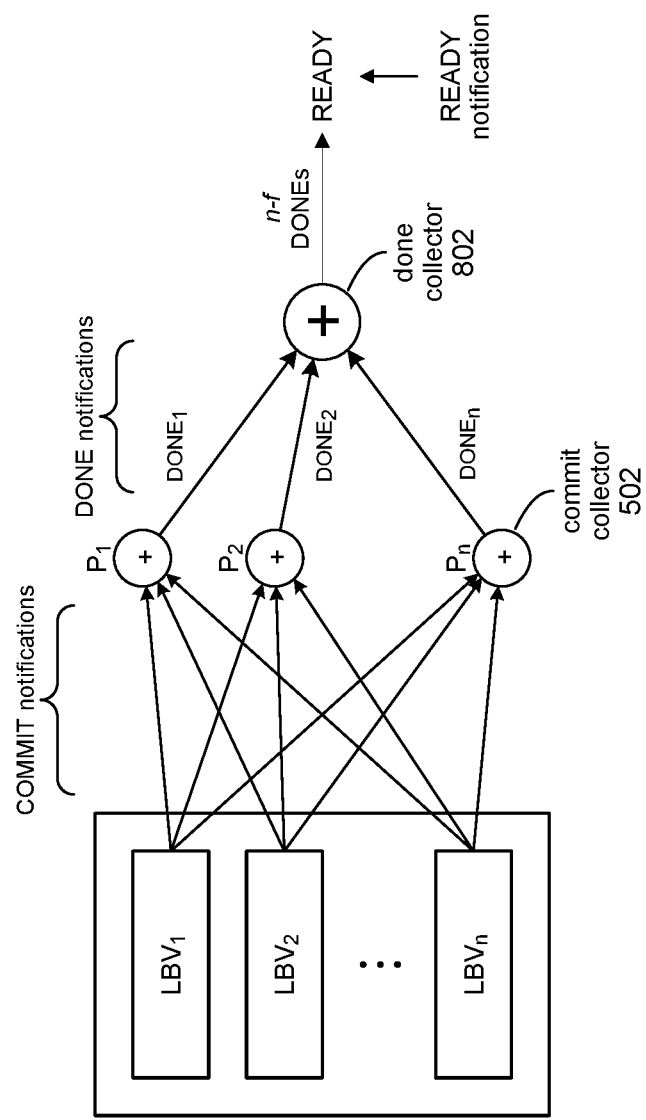
FIG. 8 illustrates processing in the framework mechanism to generate a READY notification.

At operation 704, the framework mechanism can wait until it receives a DONE notification from (n–f) parties before continuing on to operation 706. Referring for a moment to FIG. 8, the figure illustrates this aspect of the present disclosure. In some embodiments, for example, the framework mechanism can include a done collector 802. Recall that each party can signal a DONE notification. The done collector 802 can track and count the number of DONE notifications signaled by the parties before continuing on to operation 706.

At operation 706, the framework mechanism can signal each party with a READY notification. In some embodiments, for example, the READY notification can be a message that is sent to each party.

At operation 708, the framework mechanism can wait until it receives ELECTED LEADER notifications from (n–f) parties before continuing on to operation 710. The ELECTED LEADER notification can include information identifying the party that was elected the leader.

At operation 710, the framework mechanism can signal each party with a W/E notification. The W/E notification can include the LBV instance in which the elected leader (identified in operation 708) is the leader participant. Thus, for example, if party $P_j$ is the elected leader, the W/E notification will identify instance $LBV_j$.

At operation 712, the framework mechanism can terminate with a decision or initiate another wave. In some embodiments, for example, if the value decided by the elected leader (elected party) is not a safe value (⊥), then processing can continue at operation 714. If the value decided by the elected leader is the safe value, the framework mechanism can initiate another wave (view) to continue driving the process in order to reach a decision.

Processing can return to operation 702 to initiate the next wave. In some embodiments, for example, the framework mechanism can use the closing state of the elected leader (identified at operation 708) as the input state for the next wave. Because the framework mechanism starts a new view (wave) using the closing state of the previous view (i.e., closing state of the elected leader), the process can ensure safety because correct parties will decide on the same value. Formally, we say that the LBVs are properly composed by a party p in an execution if $p_i$ invokes the engage of the first instance with some fixed initial state (which depends on the instantiated protocol), and for every instance k>1, $p_i$ invokes its engage with the output of wedge&exchange at instance k−1. In addition, we say that the LBV instances are properly composed in an execution if they are properly composed by all correct parties.

At operation 714, the framework mechanism can decide the value that was decided by the elected leader. Processing can be deemed complete because a decision has been reached. As noted above, by the Completeness property of LBV, if a successfully completed LBV instance is elected, then all W&E invocations by correct parties return v≠⊥ and thus all correct parties decide v in this wave. Therefore, when the framework mechanism returns the decision of the elected leader, the value is correct. Moreover, since all parties wait until f+1 LBV instances have successfully completed before electing the leader, the parties elect a successfully completed instance with a constant probability of $$\frac{f+1}{n},$$

and even an adaptive adversary has no power to prevent it.

Asynchronous Fair State Machine Replication

The discussion will now turn to a description of the framework mechanism in the context of an asynchronous fair state machine replication (SMR). The pseudocode for the asynchronous fair state machine replication appears in Algorithm 2:

---
ALGORITHM 2
---
```
 1: upon SMR-propose(S) do
 2:     slot ← 0
 3:     for every s ∈ N do
 4:         M[s] ← { }
 5:         V[s] ← ⊥; D[s] ← false
 6:     while true do
 7:         slot ← slot + 1
 8:         SS-propose(slot, S[slot])
 9:         wait until D[slot] = true
10:         send "slot, DECIDE, value" to all parties
11:         barrier-ready_slot( )
12:         barrier-sync_slot( )
13:         free all resources associated with slot
14:         output⟨ slot, V[slot]⟩
15: upon decide⟨ slot, v⟩ do
16:     V[slot] ←v; D[slot] ← true
17: upon receiving "slot, DECIDE, v" from party pj do
18:     M[slot] ← M[slot] ∪ {⟨pj, v⟩}
19:     if ∃v s.t. |{p |⟨p, v⟩∈ M[slot]}| = f + 1 then
20:         V[slot] ←v; D[slot] ← true
```

The parameter S, passed to the SMR-propose invocation, is a vector consisting of an initial state for each slot. We use an instance of the asynchronous single-shot agreement to agree on the value of each slot, and thus the SMR algorithm inherits the Integrity, Fairness, Validity and Agreement properties from the single-shot one. In order to satisfy FIFO, parties do not advance to the next slot until they learn the decision of the current one, and in order to satisfy Halting they de-allocate all resources associated with the current slot and abandon the slot's single-shot algorithm once they move. Note that abandoning a single-shot algorithm might violate its Termination because it relies on the participation of all correct parties. Therefore, to satisfy the Termination of the SMR, we use a forwarding mechanism to reliably broadcast the decision value before abandoning the current slot and moving to the next one.

Because the framework is model agnostic, parties do not explicitly use threshold signatures and decision proofs in the forwarding mechanism. Instead, in every slot, correct parties waits until they either decide on a value v (via the slot's single-shot agreement) or receive f+1 "DECIDE" messages from parties claiming they have decided on a value v. In the second case, the receiving party knows that at least one correct party decided v even in the byzantine failure model. Then, to make sure that all correct parties eventually finish waiting even though some might have moved to the next slot already, parties use the barrier abstraction that provides the required guarantee with its B-Coordination property. Note that although the above forwarding mechanism works for both byzantine and crash failures models, in the latter case the forwarding mechanism can be simplified: a party only needs to echo its decision value before it moves to the next slot. So in this case, the lines 4, 11, 12, 18, and 19 in the pseudocode can be dropped.

Figure 9:
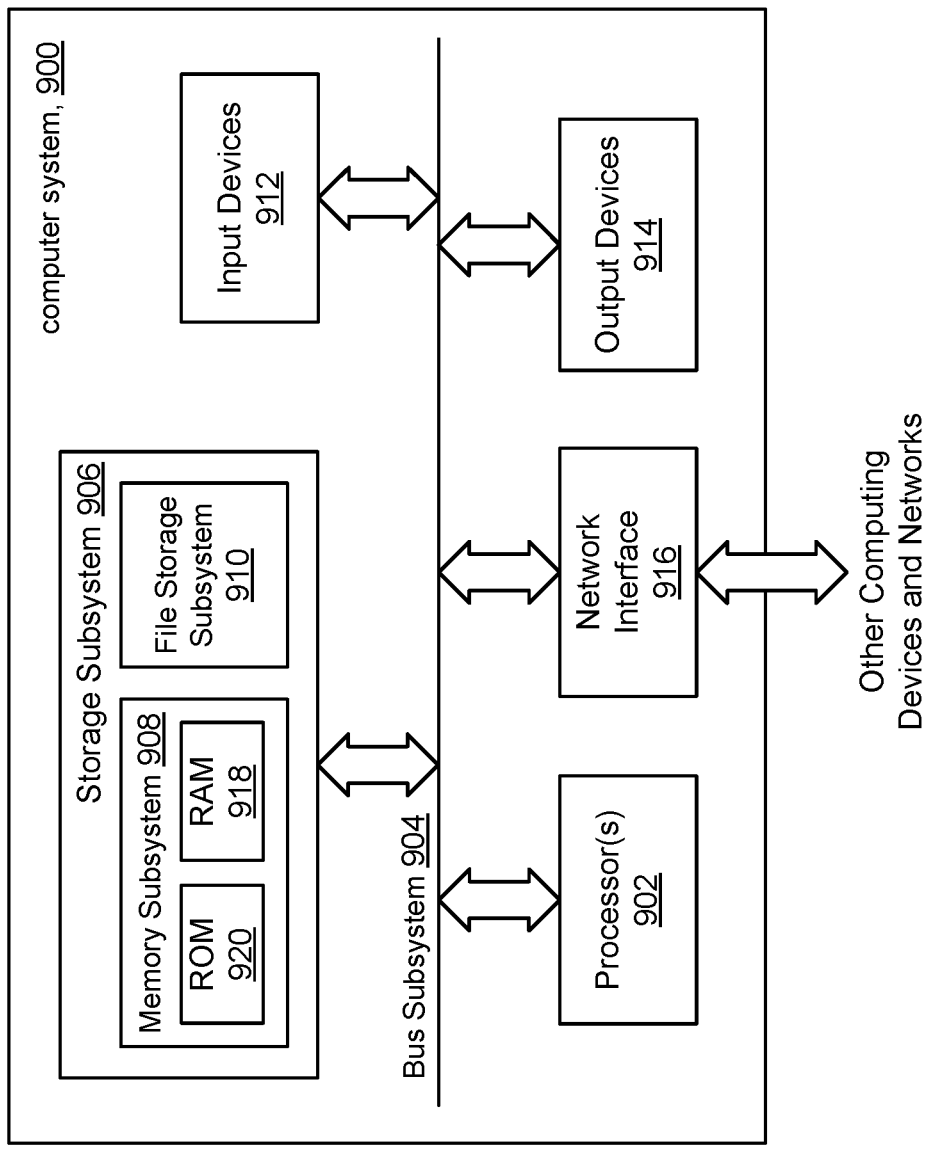
FIG. 9 is an illustrative example of a computer system adapted to operate in accordance with the present disclosure.

FIG. 9 depicts a simplified block diagram of an example computer system 900 according to certain embodiments. Computer system 900 can be used to implement nodes (parties, replicas) 102 (FIG. 1) and framework node 602 (FIG. 6) described in the present disclosure. As shown in FIG. 9, computer system 900 includes one or more processors 902 that communicate with a number of peripheral devices via bus subsystem 904. These peripheral devices include storage subsystem 906 (comprising memory subsystem 908 and file storage subsystem 910), user interface input devices 912, user interface output devices 914, and network interface subsystem 916.

Bus subsystem 904 can provide a mechanism for letting the various components and subsystems of computer system 900 communicate with each other as intended. Although bus subsystem 904 is shown schematically as a single bus, alternative embodiments of the bus subsystem can utilize multiple busses.

Network interface subsystem 916 can serve as an interface for communicating data between computer system 900 and other computer systems or networks. Embodiments of network interface subsystem 916 can include, e.g., an Ethernet card, a Wi-Fi and/or cellular adapter, a modem (telephone, satellite, cable, ISDN, etc.), digital subscriber line (DSL) units, and/or the like.

User interface input devices 912 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 900.

User interface output devices 914 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 900.

Memory subsystem 906 includes memory subsystem 908 and file/disk storage subsystem 910 represent non-transitory computer-readable storage media that can store program code and/or data, which when executed by processor 902, can cause processor 902 to perform operations in accordance with embodiments of the present disclosure.

Memory subsystem 908 includes a number of memories including main random access memory (RAM) 918 for storage of instructions and data during program execution and read-only memory (ROM) 920 in which fixed instructions are stored. File storage subsystem 910 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 900 is illustrative and many other configurations having more or fewer components than system 900 are possible.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method comprising:
a first server, among a plurality of servers, participating in a plurality of concurrently executing leader-based views (LBVs), each LBV representing the plurality of servers executing a consensus protocol;
the first server participating in a first LBV among the plurality of LBVs as a leader participant, wherein each server in the plurality of servers other than the first server participates in the first LBV as a non-leader participant;
the first server participating in each LBV in the plurality of LBVs other than the first LBV as a non-leader participant;
the first server signaling a first notification when the first server has reached consensus among a first predetermined number of the plurality of LBVs;
the first server electing a leader from among the plurality of servers after the first notification has been signaled by a second predetermined number of servers; and
the first server reaching consensus based on a closing state of the elected leader, wherein consensus is reached without waiting for timers among the plurality of servers to expire so that reaching consensus occurs even when one or more of the plurality of servers become non-responsive.

2. The method of claim 1, wherein the closing state of the elected leader includes a value v that the elected leader decided on, wherein reaching consensus includes deciding on the value v.

3. The method of claim 1, wherein the first server participating as the leader in the first LBV proposes a value v to be agreed upon by the non-leader participants in the first LBV.

4. The method of claim 1, wherein upon electing the leader, the plurality of concurrently executing LBVs are terminated, wherein a subsequent plurality of concurrently executing LBVs are initiated using the closing state of the elected leader as an initial state in the subsequent plurality of concurrently executing LBVs.

5. The method of claim 1, the first server electing a leader from among the plurality of servers when a second predetermined number of the plurality of servers have signaled the first notification.

6. The method of claim 1, wherein each server is a leader in a corresponding LBV, wherein each server proposes a value for which consensus in the value is to be reached.

7. The method of claim 1, wherein the first predetermined number is (n−f), where n is the number of servers and f is the number of allowed faulty servers.

8. A non-transitory computer-readable storage medium having stored thereon computer executable instructions, which when executed by a computer device in a server among a plurality of servers, cause the computer device to:
participate in a plurality of concurrently executing leader-based views (LBVs), each LBV representing the plurality of servers executing a consensus protocol;
participate in a first LBV among the plurality of LBVs as a leader participant, wherein each server in the plurality of servers other than the first server participates in the first LBV as a non-leader participant;
participate in each LBV in the plurality of LBVs other than the first LBV as a non-leader participant;
signal a first notification when the first server has reached consensus among a first predetermined number of the plurality of LBVs;
elect a leader from among the plurality of servers after the first notification has been signaled by a second predetermined number of servers; and
reach consensus based on a closing state of the elected leader, wherein consensus is reached without waiting for timers among the plurality of servers to expire so that reaching consensus occurs even when one or more of the plurality of servers become non-responsive.

9. The non-transitory computer-readable storage medium of claim 8, wherein the closing state of the elected leader includes a value v that the elected leader decided on, wherein reaching consensus includes deciding on the value v.

10. The non-transitory computer-readable storage medium of claim 8, wherein the first server participating as the leader in the first LBV proposes a value v to be agreed upon by the non-leader participants in the first LBV.

11. The non-transitory computer-readable storage medium of claim 8, wherein upon electing the leader, the plurality of concurrently executing LBVs are terminated, wherein a subsequent plurality of concurrently executing LBVs are initiated using the closing state of the elected leader as an initial state in the subsequent plurality of concurrently executing LBVs.

12. The non-transitory computer-readable storage medium of claim 8, wherein the computer executable instructions, which when executed by the computer device, further cause the computer device to elect a leader from among the plurality of servers when a second predetermined number of the plurality of servers have signaled the first notification.

13. The non-transitory computer-readable storage medium of claim 8, wherein each server is a leader in a corresponding LBV, wherein each server proposes a value for which consensus in the value is to be reached.

14. The non-transitory computer-readable storage medium of claim 8, wherein the first predetermined number is (n—f), where n is the number of servers and f is the number of allowed faulty servers.

15. A server among a plurality of servers, the server comprising:
one or more computer processors; and
a computer-readable storage medium comprising instructions for controlling the one or more computer processors to cause the server to:
participate in a plurality of concurrently executing leader-based views (LBVs), each LBV representing the plurality of servers executing a consensus protocol;
participate in a first LBV among the plurality of LBVs as a leader participant, wherein each server in the plurality of servers other than the first server participates in the first LBV as a non-leader participant;
participate in each LBV in the plurality of LBVs other than the first LBV as a non-leader participant;
signal a first notification when the first server has reached consensus among a first predetermined number of the plurality of LBVs;
elect a leader from among the plurality of servers after the first notification has been signaled by a second predetermined number of servers; and
reach consensus based on a closing state of the elected leader, wherein consensus is reached without waiting for timers among the plurality of servers to expire so that reaching consensus occurs even when one or more of the plurality of servers become non-responsive.

16. The server of claim 15, wherein the closing state of the elected leader includes a value v that the elected leader decided on, wherein reaching consensus includes deciding on the value v.

17. The server of claim 15, wherein the first server participating as the leader in the first LBV proposes a value v to be agreed upon by the non-leader participants in the first LBV.

18. The server of claim 15, wherein upon electing the leader, the plurality of concurrently executing LBVs are terminated, wherein a subsequent plurality of concurrently executing LBVs are initiated using the closing state of the elected leader as an initial state in the subsequent plurality of concurrently executing LBVs.

19. The server of claim 15, wherein the computer-readable storage medium further comprises instructions for controlling the one or more computer processors to elect a leader from among the plurality of servers when a second predetermined number of the plurality of servers have signaled the first notification.

20. The server of claim 15, wherein each server is a leader in a corresponding LBV, wherein each server proposes a value for which consensus in the value is to be reached.

* * * * *